(12) United States Patent  (10) Patent No.: US 7,565,088 B2
Shibasaki  (45) Date of Patent: Jul. 21, 2009

(54) IMAGE FORMING APPARATUS AND COMMUNICATION UNIT THEREFOR

(75) Inventor: Junpei Shibasaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 143 days.

(21) Appl. No.: 11/041,944

(22) Filed: Jan. 26, 2005

(65) Prior Publication Data

US 2005/0168760 A1    Aug. 4, 2005

(30) Foreign Application Priority Data

Jan. 30, 2004    (JP) .............................. 2004-023461

(51) Int. Cl.
  *G03G 15/00*    (2006.01)
(52) U.S. Cl. ......................................... 399/81; 399/83
(58) Field of Classification Search .................. 399/81, 399/82, 83
  See application file for complete search history.

(56) References Cited

U.S. PATENT DOCUMENTS 5,129,639 A * 7/1992 DeHority .................. 270/1.01
5,459,580 A * 10/1995 Suzuki ...................... 358/296
2004/0009003 A1 * 1/2004 Kim ........................... 399/81
2004/0047643 A1 * 3/2004 Jackelen et al. ............. 399/81

FOREIGN PATENT DOCUMENTS

JP    2002-091747    3/2002
JP    2003-078674    3/2003
JP    2004-004296    1/2004

* cited by examiner

*Primary Examiner*—David M Gray
*Assistant Examiner*—Bryan P Ready
(74) *Attorney, Agent, or Firm*—Rabin & Berdo, P.C.

(57) ABSTRACT

An image forming apparatus according to this invention includes a memory for memorizing a first image forming condition previously set, a comparison unit for comparing the second image forming condition transmitted from a host apparatus with the first image forming condition, and a communication unit for transmitting, in a case where the first and second image forming conditions are different from each other, a prescribed message corresponding to the second image forming condition to a host apparatus, to advantageously utilize image formation under saving modes, such as costs, as intended by managers of, e.g., the image forming apparatus, costs, thereby allowing the operators of the image forming apparatus to automatically know the first image forming condition recommended with the image forming apparatus.

14 Claims, 9 Drawing Sheets

| paper size | | plain paper printing | back side printing | double side printing | N-up printing | toner saving printing |
|---|---|---|---|---|---|---|
| A4 size | A4-1 | B | A | B | A | B |
|  | A4-2 | A | B | A | A | A |
| A3 size | A3-1 | A | | B | B | A |

Current setting is for use of "plain paper" tray.
Would you like to change it for the setting for use
of "one side printed paper" tray?

| Yes | No |

| No | user IP address | name | affiliation | plain paper printing | back side printing | double side printing | N-up printing | toner saving printing |
|---|---|---|---|---|---|---|---|---|
| 1 | 10.20.30.40 | user name1 | Engineering | B | A | B | A | A |
| 2 | 10.20.30.41 | user name2 | Engineering | A | B | A | A | A |
| 3 | 10.20.30.42 | user name3 | Engineering | A | | B | B | A |

FIG.10

IMAGE FORMING APPARATUS AND COMMUNICATION UNIT THEREFOR

BACKGROUND OF THE INVENTION

1. Field of the Invention

This invention relates to an image forming apparatus.

2. Description of Related Art

Conventionally, in a case where printing is operated in using an image forming apparatus such as, e.g., a printer, a photocopier, or a facsimile machine, for example, in using the printer, the printer performs printing as image forming operation according to settings such as, e.g., paper type and printing mode instructed based on printer drivers located inside a host apparatus when the host apparatus connected to the printer generates image forming data (printing data) for forming images and issues and transmits image forming instructions to the printer.

For improvements of printing cost, printers are provided such that can print under a saving mode such as, e.g., backside printing in using one side printed papers, double-side printing, or N-up printing for printing multiple pages on a single sheet of paper Particularly, printers connected to a network or networks take great advantages when printing in the above saving mode because an undefined plural number of users may use such printers (see, e.g., Japanese Patent Application Publication No. JA-H6-255842).

With the above conventional printers, however, an operator needs to know in advance as to which tray is set with the one side printed papers in a case of the back-side printing, and also, the operator needs to operate, prior to the printing, prescribed settings upon opening a menu of the printer drivers in a case of the double-side printing or the N-up printing, so that it is not easy to be handled by the operator. Each saving mode as described above is therefore not effectively utilized as different from what printer managers, cost managers, and the like intend.

It is an object of this invention to solve the problems in the above conventional image forming apparatus, and further to provide an image forming apparatus in which the image formation under the saving modes can be utilized effectively.

SUMMARY OF THE INVENTION

To achieve the above, an image forming apparatus according to this invention has a memory for memorizing a first image forming condition set previously; a comparison unit for comparing the second image forming condition transmitted from a host apparatus with the first image forming condition; and a communication unit for, in a case where the first and second image forming conditions are different from each other, transmitting a prescribed message corresponding to the second image forming condition to the host message.

As described above in detail, according to this invention, the image forming apparatus has the memory for memorizing the first image forming condition set preliminary; the comparison unit for comparing the second image forming condition transmitted from the host apparatus with the first image forming condition; and the communication unit for, in a case where the first and second image forming conditions are different from each other, transmitting the prescribed message corresponding to the second image forming condition to the host message.

In the above case, where the first and second image forming conditions are different from each other, the communication unit transmits the prescribed message corresponding to the second image forming condition to the host apparatus, so that an manager can know automatically the first image forming condition recommended from the image forming apparatus. The image formation under saving modes, therefore, can be effectively utilized as intended by those who such as the printer managers and the cost managers.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DETAILED DESCRIPTION OF PREFERRED EMBODIMENTS OF THE INVENTION

Hereinafter, embodiments according to this invention will be described with reference to the drawings. In that case, a printer serving as an image forming apparatus will be described.

Figure 1:
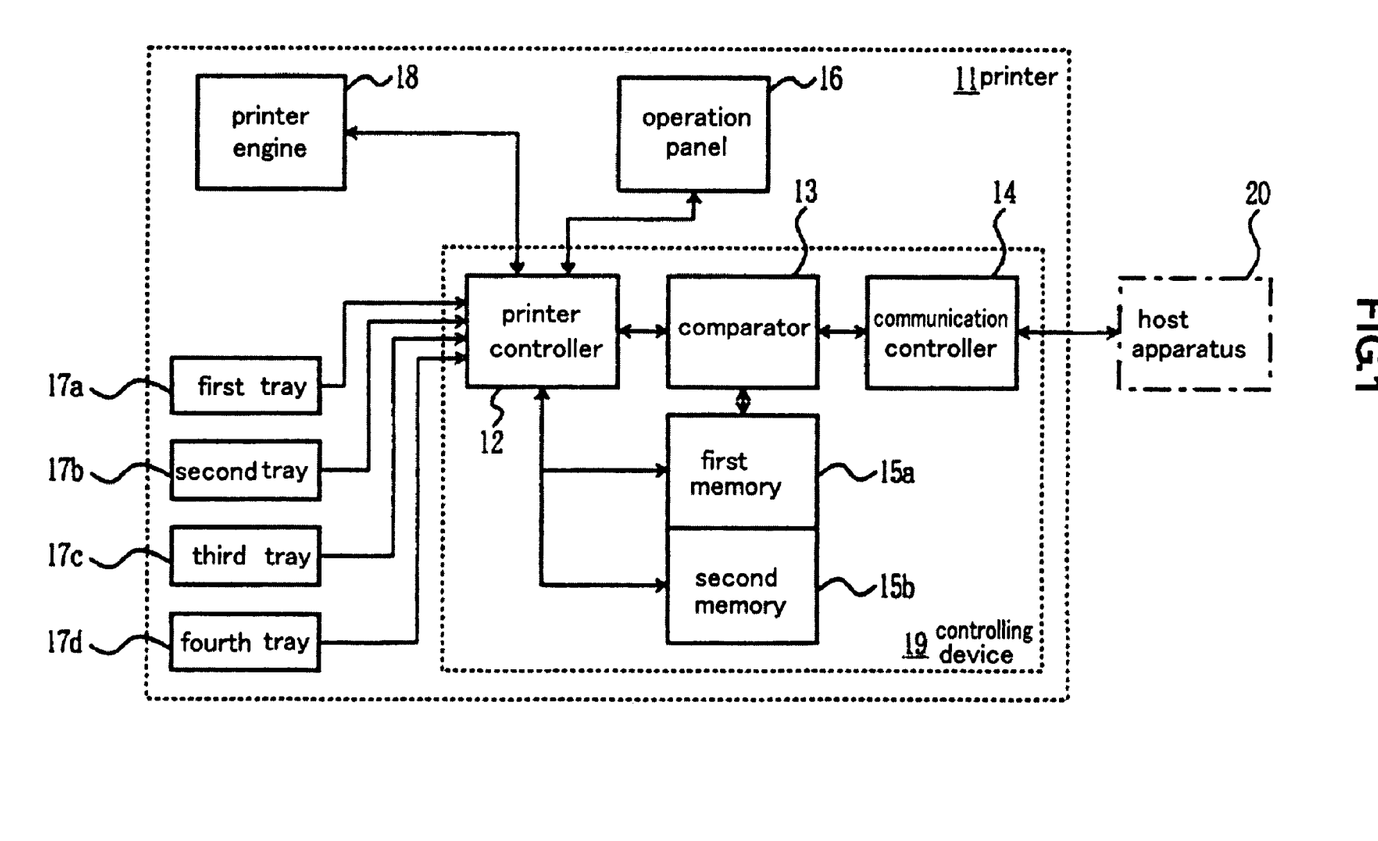
FIG. 1 is a block diagram showing a printer according to the first embodiment of this invention.

FIG. 1 is a block diagram showing a printer according to the first embodiment of this invention.

In FIG. 1, numeral 11 is a printer while numeral 20 is a host apparatus such as, e.g., a Personal Computer (PC), a workstation, or the like, connected to the printer 11. Numeral 12 is a printer controller serving as a controller, including, e.g., Central Processing Unit (CPU), Read Only Memory (ROM), and Random Access Memory (RAM), operating, e.g., interpretation, image processing, and development processing about data such as, e.g., image forming data received from the host apparatus 20, and transmitting, to a printer engine 18 serving as an image forming unit, the data on which the development is processed. Numeral 13 is a comparator serving as a comparison unit, making comparisons between image forming condition A serving as a first image forming condition stored in the first memory 15a and image forming condition B serving as a second image forming condition transmitted from the host apparatus 20, making a judgment as to whether the image forming conditions A and B coincide to each other, and checking flags transmitted from the host apparatus. Numeral 14 is a communication controller serving as a communication unit, receiving the image forming condition B and the image forming data transmitted from the host apparatus 20, and transmitting messages read from the second memory 15b to the host apparatus 20.

The first memory 15a, furthermore, is formed with a rewritable nonvolatile memory and memorizes, as the image forming condition A, the image forming condition input upon manipulations with an operation panel 16 serving as an operation unit, and the second memory 15b is formed with a rewritable nonvolatile memory and memorizes messages for asking change of the image forming condition B. The operation panel 16 displays prescribed information and receives, based on the operator's operation, prescribed inputting manipulations.

Numerals 17a to 17d are the first, second, third, and forth trays respectively serving as the first to fourth medium containers for setting papers as media. The printer engine 18 has a photosensitive drum, not shown, serving as an image carrier, a charging roller serving as a charging device, a print head serving as an exposure device, a developing device, a transfer roller serving as a transfer device, a fuser, etc. thereby making printing as actual image forming operation.

A controlling device 19 is constituted of the printer controller 12, the comparator 13, the communication controller 14, the first memory 15a, and the second memory 15b. It is to be noted that the host apparatus 20, the controlling device 19, and the printer controller 12 function as a computer based on prescribed programs and data.

Figure 2:
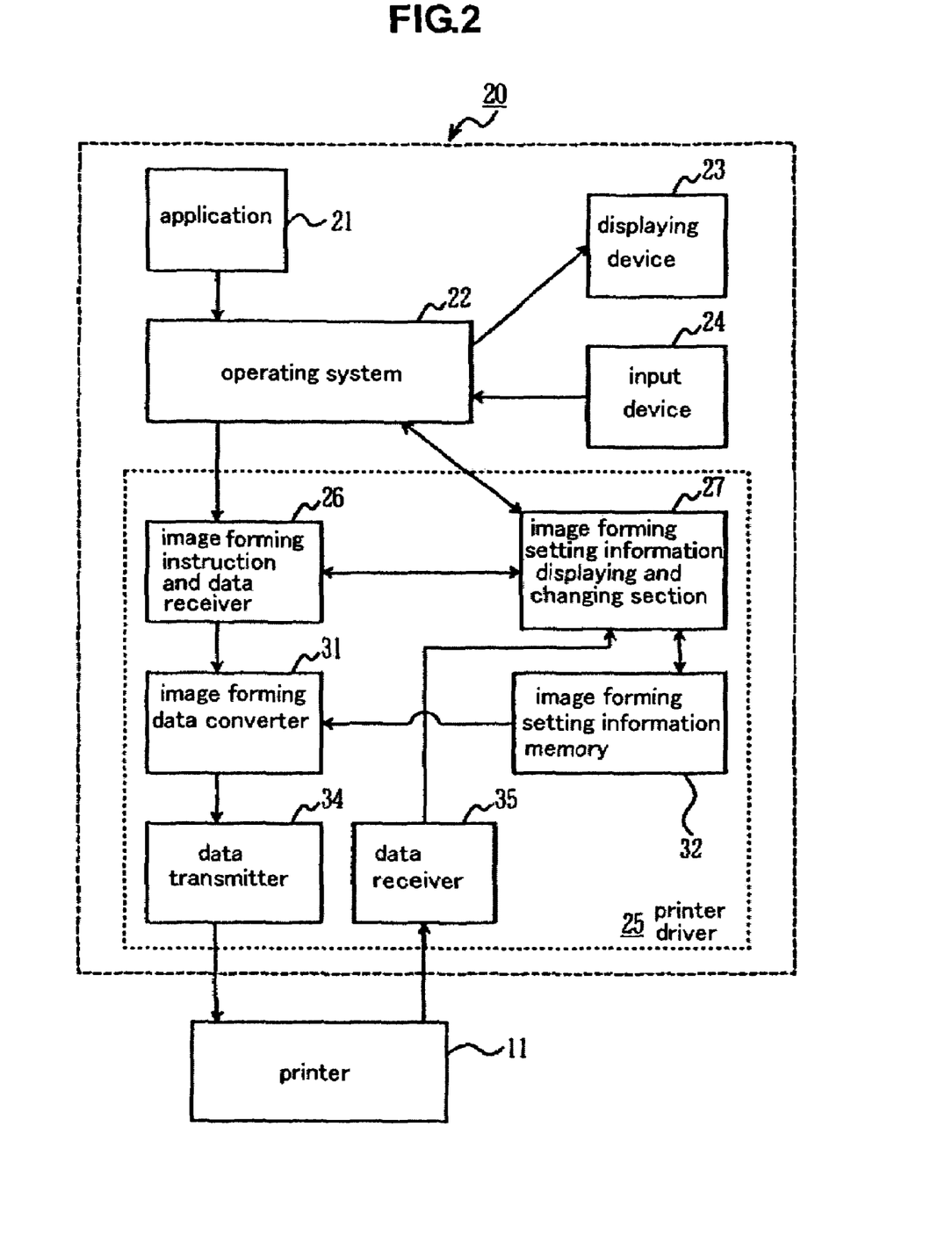
FIG. 2 is a block diagram showing a host apparatus according to the first embodiment of this invention.

FIG. 2 is a block diagram showing the host apparatus according to the first embodiment of this invention.

In FIG. 2, numeral 20 is the host apparatus; numeral 21 is an application for generating documents and for operating the printing defined as the image formation; and numeral 22 is an operating system. The operating system 22 manages the application 21, a displaying device 23 composed of, e.g., a Liquid Crystal Display (LCD) or a Cathode-Ray Tube (CRT), an input device 24 such as, e.g., a keyboard, and a printer driver 25 serving as a driver. Furthermore, the printer driver 25 produces the image forming data in association with the printer 11 according to the document generated with the application 21.

The printer driver 25 includes an image forming instruction and data receiver 26 serving as an image forming instruction and data reception unit for receiving image forming instructions and the image forming data, an image forming setting information displaying and changing section 27 serving as an image forming setting information displaying and changing unit for displaying image forming setting information such as, e.g., forms of the image forming data, for changing the image forming setting information based on the operator's operation, and for storing the image forming setting information in an image forming setting information memory 32, an image forming data converter 31 serving as an image forming data converting unit for converting, based on the image forming setting information read from the image forming setting information memory 32, the image forming data already received with the printing forming instruction and data receiver 26 into the image forming data depending on the printer 11, the image forming setting information memory 32, a data transmitter 34 serving as a data transmitting unit for transmitting the printing forming data to the printer 11, and a data receiver 35 serving as a data receiving unit for receiving the message transmitted from the printer 11.

It is to be noted that the image forming setting information memory 32 has, other than a memory area for memorizing the image forming setting information, a memory area for setting flags indicating status of change in the image forming condition B. The setting flag is expressed by zero or one, and where the setting flag has a value of zero, the image forming condition B is not yet changed whereas where the setting flag has a value of one, the image forming condition is already changed. It is to be noted that the setting flag is always set to zero at first.

In this embodiment, before the operator operates the printing, a manager of the printer 11 sets, based on cost, usability of the printer 11, and the like, a recommended image forming condition (recommended printing condition) recommended to operators, i.e., the image forming condition A.

A setting method for the image forming condition A is described next.

Figure 3:
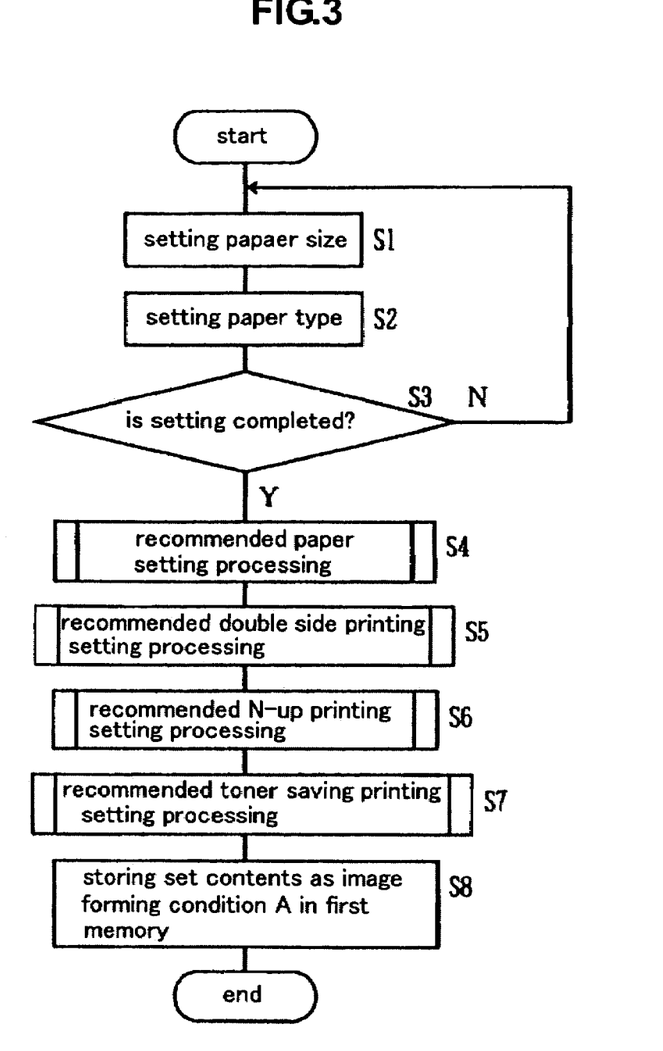
FIG. 3 is a flowchart showing a setting method for a recommended image forming condition according to the first embodiment of this invention.
Figure 4:
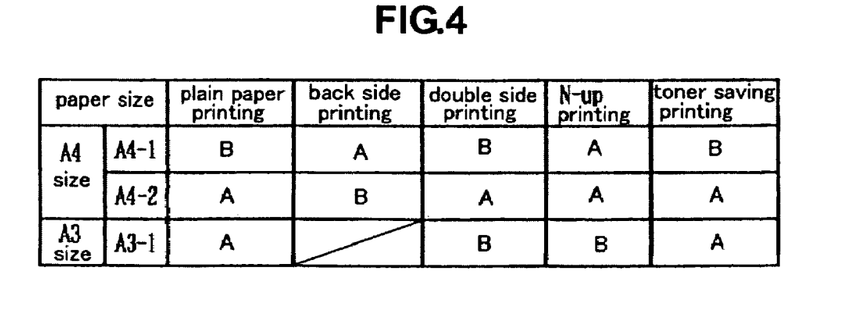
FIG. 4 is a table showing an example of a recommended image forming condition according to the first embodiment of this invention.

FIG. 3 is a flowchart showing the setting method for the recommended image forming condition according to the first embodiment of this invention, and FIG. 4 is a table showing an example of the recommended image forming condition according to the first embodiment of this invention.

A manager, firstly, turns the power on and calls an input screen for the image forming setting information upon operating the operation panel 16. The manager subsequently sets sizes of papers to which the image forming condition A is applied, i.e., the paper size (e.g., size of letter size, legal size, A4, A3, B4, etc.), thereby setting the paper type (e.g., a plain paper, a one side printed paper, etc.) set on each of the first tray 17a, the second tray 17b, the third tray 17c, and the fourth tray 17d, to all of which the image forming condition A is applied.

The setting of the paper type is thus operated to all of the usable trays, and for example, where the one side printed papers of A4 size, the plain papers of A4 size, and the plain papers of A3 size are set respectively to the first tray 17a, the second tray 17b, and the third tray 17c, the respective trays and the respective paper types set at the trays are memorized in the first memory 15a as corresponding to each other.

When the setting of the paper size and the paper type to each of the trays is completed in this way, the manager designates the paper recommended and prioritized for each paper size, i.e., the recommended paper, for example, the manager designates the one side printed papers as priority papers with respect to the papers of A4 size while designating the plain papers as priority papers with respect to the papers of A3 size. According to this setting, a recommended paper setting unit in the printer controller 12, not shown, operates a recommended paper setting processing, thereby determining the recommended paper for each paper size.

Subsequently, when the manager designates whether to recommend the double-side printing, a recommended double-side printing setting unit in the printer controller 12, not shown, operates a recommended double-side printing setting processing, thereby setting whether to recommend the double-side printing. At this time, where the double-side printing is recommended, the back-side printing is not to be recommended and, namely, any tray on which the one side printed papers are set is not to be used.

When the manager, furthermore, designates whether to recommend the N-up printing, a recommended N-up printing setting unit in the printer controller 12, not shown, operates a recommended N-up printing setting processing, thereby setting whether to recommend the N-up printing. Where the N-up printing is recommended, the number of pages is set for each paper size.

When the manager designates whether to recommend toner saving printing, a recommended toner saving printing unit in the printer controller 12, not shown, operates a recommended toner saving printing processing, thereby setting whether to recommend the toner saving printing. A memory unit located in the printer controller 12, not shown, performs memory processing, thereby storing each of the set contents as the image forming condition A in the first memory 15a.

The manager thus sets the image forming condition A for the printer 11.

FIG. 4 is a table showing an example of the set contents, and the manager sets at first the image forming condition A having the set contents such as shown in FIG. 4. For example, when the manager designates A4-1 of A4 size, the back-side printing and the N-up printing are set. In FIG. 4, it is to be noted that mark "A" expresses the status where the corresponding saving mode is set whereas mark "B" expresses the status where the corresponding saving mode is not set.

The flowchart is explained next. The paper size is set at the step S1. The paper type is set at the step S2. The judgment is made at the step S 3 as to whether the setting is completed. Where the setting is already completed, the operation goes to the step S4, whereas where the setting is not yet completed, the operation returns to the step S1. The recommended paper setting processing is implemented at the step S4. The recommended double-side printing setting processing is implemented at the step S5. The recommended N-up printing setting processing is implemented at the step S6. The recommended toner saving printing setting processing is implemented at the step S7. The set contents are stored as the image forming recommended condition A in the first memory 15a, and this processing is completed at the step S8.

Printing operation of the host apparatus 20 and the printer 11 is explained next.

Figure 5:
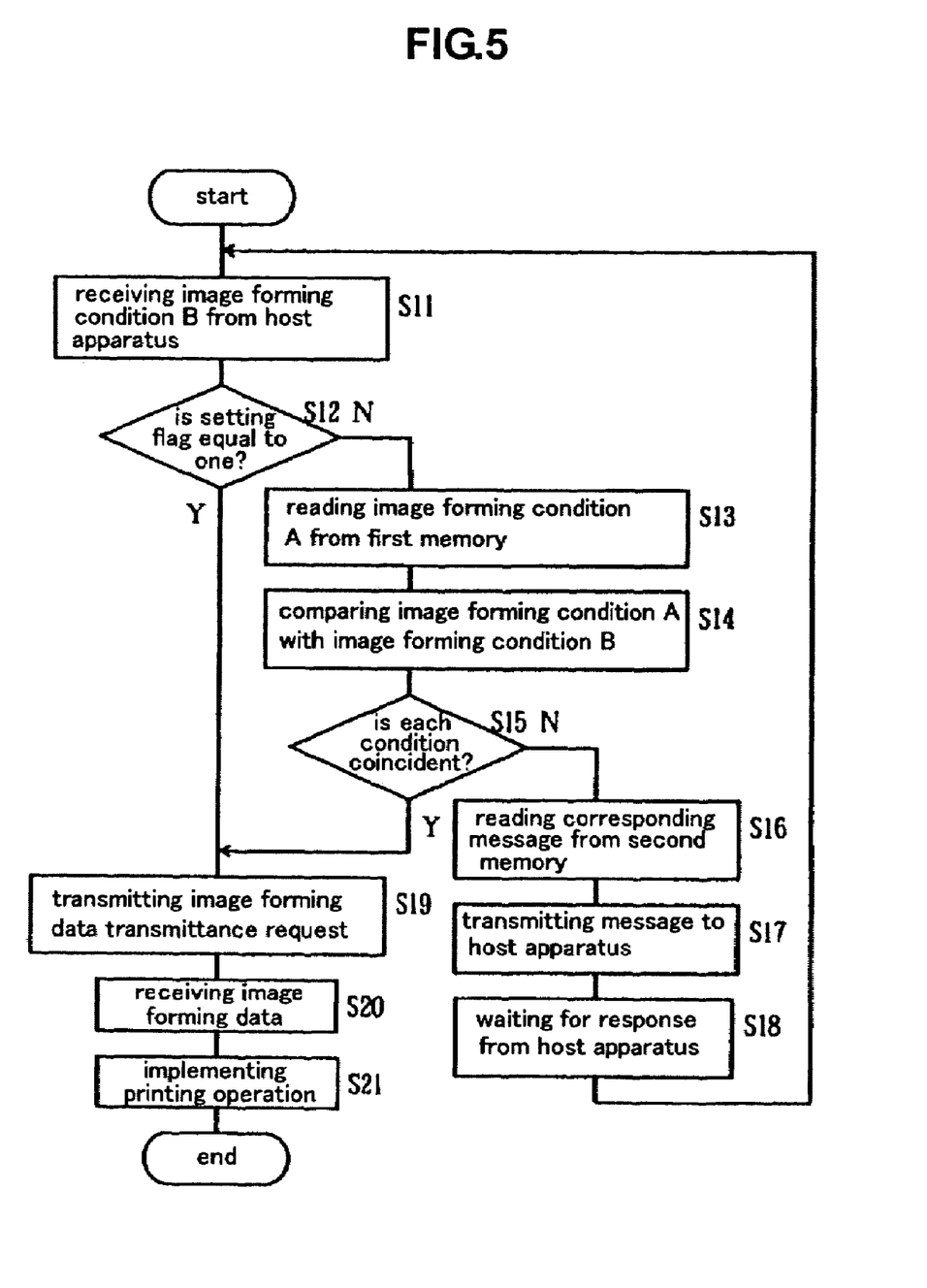
FIG. 5 is a flowchart showing operation of the printer according to the first embodiment of this invention.
Figure 6:
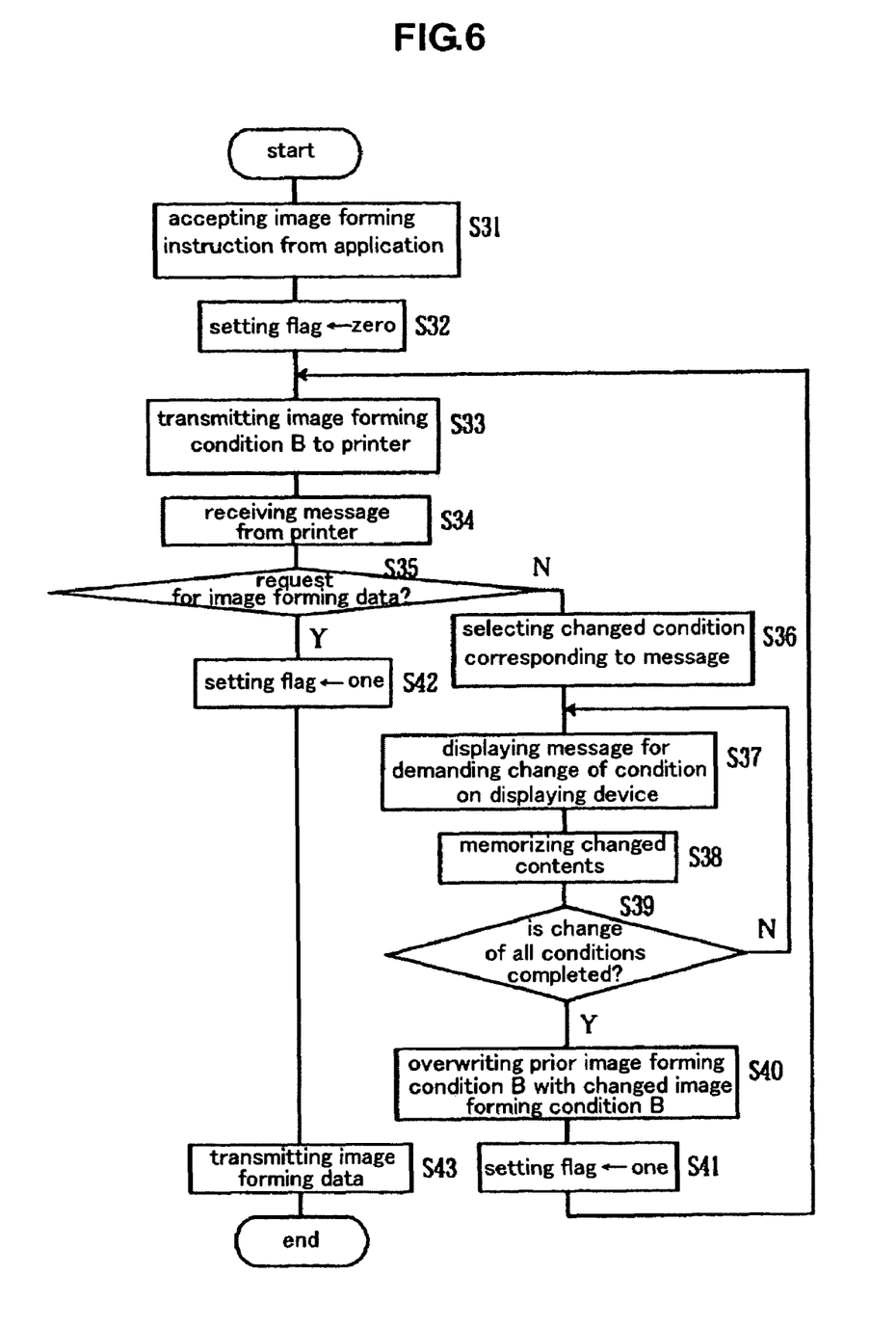
FIG. 6 is a flowchart showing operation of the host apparatus according to the first embodiment of this invention.
Figure 7:
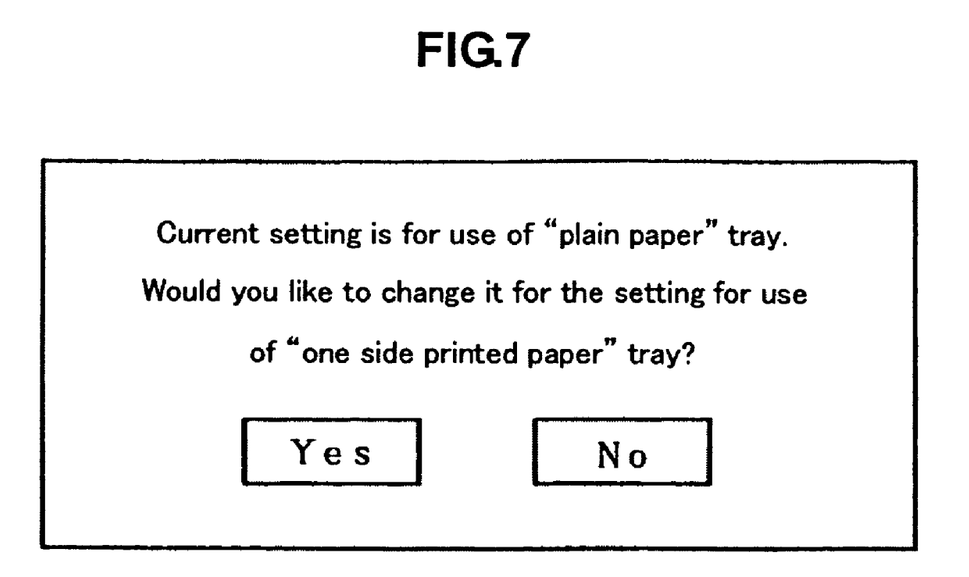
FIG. 7 is a screen view showing a change message according to the first embodiment of this invention.

FIG. 5 is a flowchart showing operation of the printer according to the first embodiment of this invention; FIG. 6 is a flowchart showing operation of the host apparatus according to the first embodiment of this invention; and FIG. 7 is a screen view showing a change message according to the first embodiment of this invention.

First, on the host apparatus 20, the operator creates the image forming data upon using the application 21 or the like. For that purpose, the operator opens a printing menu with the application 21 or the like to give an image forming instruction, so that the operating system 22 transmits the image forming data and the image forming setting information to the printer driver 25.

In the printer driver 25, the image forming setting information displaying and changing section 27 operates image forming setting information displaying and changing processing, thereby storing the image forming setting information as the image forming condition B in the image forming setting information memory 32. It is to be noted that in a case of changing the image forming setting information, the image forming setting information displaying and changing section 27 reads, based on the operator's operation with the input device 24, the image forming setting information from the image forming setting information memory 32, and changes the above information, thereby storing the changed image forming setting information as the image forming condition B in the image forming setting information memory 32.

In the printer driver 25, furthermore, when the image forming instruction and data receiver 26 operates image forming instruction and data receiving processing, thereby receiving the image forming data, the setting flag in the image forming setting information memory 32 is set to zero at first. The image forming data converter 31 operates image forming data converting processing, thereby converting, based on the image forming setting information stored in the image forming setting information memory 32, the image forming data transmitted from the operating system 22 into the image forming data depending on the printer 11.

The data transmitter 34 subsequently operates data transmitting processing to transmit the image forming condition B together with the information that the setting flag is zero to the printer 11.

Where the printer 11 receives the image forming condition B and the information that the setting flag is zero through the communication controller 14 (in FIG. 1) from the host apparatus 20, an image forming condition retrieving unit in the printer controller 12 implements image forming condition retrieving processing, thereby making a judgment as to whether the setting flag is zero or one. Since in this embodiment, the setting flag is always set to zero at first, the image forming condition retrieving unit reads the image forming condition A out of the first memory 15a.

In the printer 11, subsequently, the comparator 13 implements comparing processing to make the comparison between the image forming condition A on the printer 11 side and the image forming condition B transmitted from the host apparatus 20, thereby making a judgment as to whether any coincident condition exists. Where all of the conditions are coincident with (or equal to) each other, a transmittance request unit in the printer controller 12, not shown, implements transmittance request processing to transmit an image forming data transmittance request to the host apparatus 20. Where any portion is discordant (or different) between the conditions, the printer 11 retrieves, from the second memory 15b, the prescribed message corresponding to the image forming condition A for each non-coincident condition to transmit the above retrieved message to the host apparatus 20 through the communication controller 14, thereby waiting for a response from the host apparatus 20.

In the host apparatus 20, when the data receiver 35 implements data receiving processing to receive the message from the printer 11, when the contents of the received message forms a request for image forming data, the host apparatus 20 accepts the request for the image forming data, and the data transmitter 34 transmits the image forming data to the printer 11. Subsequently, when the printer 11 receives the image forming data, the printing unit, not shown, in the printer controller 12 operates printing processing, thereby implementing the printing operation under the image forming condition B according to the image forming data.

Where the received response is the contents other than the request for the image forming data, the response means that the image forming condition B once transmitted is not coincident with the image forming condition A recommended in the printer 11, thereby resulting the data receiver 35 to receive the message for asking the change of the image forming condition B. Where a changed condition corresponding to the received message is selected, the operating system 22 displays the message for asking the change of the condition on the displaying device 23 as shown in FIG. 7, as well as the menu for changing the image forming condition on the printer driver 25.

With respect to the displayed menu, when the operator changes the condition upon operating the input device 24, the image forming setting information displaying and changing section 27 stores the contents that are changed, i.e., the changed contents, in the image forming setting information memory 32. The change of the message and the condition, such as described above, is made to all of the unmatched conditions.

When the change of all of the conditions are thus completed, the prior image forming condition B is rewritten with the changed image forming condition B, and the image forming setting information displaying and changing section 27 sets the setting flag to zero.

The data transmitter 34 subsequently implements the data transmitting processing to transmit to the printer 11 the image forming condition B and the information that the setting flag is equal to one.

When the printer 11 receives the image forming condition B and the information that the setting flag is equal to one through the communication controller 14 from the host apparatus 20, the image forming condition retrieving unit in the printer controller 12 makes a judgment as to whether the setting flag is equal to one or zero. Because the setting flag is set to one in this embodiment, the transmittance request unit in the printer controller 12 transmits the image forming data transmittance request to the host apparatus 20.

When the host apparatus 20 receives the image forming data transmittance request, the data receiver 35 accepts the request for the image forming data, and the data transmitter 34 thereafter transmits the image forming data to the printer 11. Subsequently, when the printer 11 receives the image forming data, the printing unit in the printer controller 12 operates the printing processing, thereby implementing, according to the image forming data, the printing operation under the image forming condition B.

The flowchart in FIG. 5 is described next. The printer 11 receives the image forming condition B from the host apparatus 20 at the step S11. The judgment is made at the step S12 as to whether the setting flag is equal to one. Where the setting flag is equal to one, the operation goes to the step S19, whereas where the setting flag is not equal to one (but to zero), the operation goes to the step S13. The image forming condition retrieving unit retrieves the image forming condition A out of the first memory 15a at the step S13. The comparison is made at the step S14 between the image forming condition A and the image forming condition B. The judgment is made at the step S15 as to whether each condition is coincident. Where each condition is coincident between conditions A, B, the operation goes to the step S19. Where any condition is not coincident, the operation goes to the step S16. At the step S16, the printer 11 retrieves the corresponding message out of the second memory 15b. The printer 11 transmits the message to the host apparatus 20 at the step S17. The printer 11 waits for the response from the host apparatus 20 at the step S18, and the operation returns to the step S11. The printer 11 transmits the image forming data transmittance request at the step S19. The printer 11 receives the image forming data at the step S20. The printer 11 implements the printing operation and this processing is completed at the step S21.

The flowchart in FIG. 6 is described next. The host apparatus 20 accepts the image forming instruction from the application 21 at the step S31. The setting flag is set to zero at the step S32. The host apparatus 20 transmits the image forming condition B to the printer 11 at the step S33. The host apparatus 20 receives the message from the printer 11 at the step S34. The judgment is made at the step S35 as to whether there is the request for the image forming data. Where there is the request for the image data, the operation goes to the step S42, whereas where there is no request for the image data, the operation goes to the step S36. The host apparatus 20 displays the changed condition corresponding to the message at the step S36. The host apparatus 20 displays, on the displaying device 23, the message for asking the change of the condition at the step S37. The host apparatus 20 memorizes the changed contents at the step S38. The judgment is made at the step S39 as to whether the change of all conditions is completed. Where the change of all conditions is completed, the operation goes to the step S40, whereas where the change of all conditions is not yet completed, the operation returns to the step S37. The prior image forming condition B is rewritten with the changed image forming condition B at the step S40. At the step S41, the setting flag is set to one, and the operation returns to the step S33. The setting flag is set to one at the step S42. The image forming data is transmitted, and this processing is completed at the step S43.

The image forming condition B transmitted from the host apparatus 20 and detailed operation thereof are explained next.

Under the image forming condition B, first explained is a situation that with respect to the second tray 17b one-side printing for the plain papers of A4 size is designated in which single-page printing for printing a single page on a single sheet of paper is designated.

In that case, when the host apparatus 20 transmits the image forming condition B, the judgment is made that the setting for the second tray 17b is set to the plain paper, and the comparison unit makes a comparison between the image forming condition B and the image forming condition A. Under the image forming condition A, A4-1 is set as A4 size while the back-side printing and the N-up printing are designated.

According to the comparison between the image forming condition B and the image forming condition A, the one-side printing is designated as the image forming condition B, whereas the back-side printing is designated as the image forming condition A, and therefore, the conditions are different from each other.

The message such as shown in FIG. 7 is therefore transmitted to the host apparatus 20.

Next, when the printer 11 receives from the host apparatus 20 the image forming condition B to which some change into the back-side printing is made, a page decision unit, not shown, in the printer controller 12 implements page decision processing to make a judgment as to the number of pages to be printed. This is because printing operation is made as it is without operating the N-up printing in a case where the pages to be printed are judged as a single page. Under the image forming condition B, since the single-page printing is designated, printing is performed as it is. It is to be noted that, for example, where the number of pages is judged as two, the message is transmitted to the host apparatus 20, such as "N-up printing is not set currently. Would you like to change it to the setting for N-up printing?" and that the change is asked in the same way as the back-side printing.

Where the condition is changed to the N-up printing, the N-up printing is performed. Furthermore, when no change of the setting is made, the image forming data is requested to start printing.

It is to be noted that the message can be inputted and stored in advance in the same manner as in the image forming condition A, upon operating the operation panel 16 of the printer 11.

In this embodiment, the message for the back-side printing and the message for the N-up printing are separately transmitted, but both messages may be transmitted at the same time to ask the change of the settings.

When the messages are transmitted respectively, the number of judgments of the setting flag is rendered to be equal to the number of transmittances of the messages. In the case above described, the message is transmitted twice, so that the number of judgment of the setting flag is rendered as two. The setting flag is updated at every time the message is transmitted, and when the host apparatus 20 responses to the second message, the image forming data transmittance request is operated regardless whether the condition is changed or not. Where the change of the conditions is asked at once, the number of judgments of the setting flag is rendered as one time. Furthermore, when the host apparatus responses, the image forming data transmittance request is made regardless whether the condition is changed or not.

Next, under the image forming condition B, explained is a situation that where with respect to the second tray 17b the double-side printing is designated in which a two-page printing for printing two pages on a single sheet of paper is designated.

In that case, when the host apparatus 20 transmits the image forming condition B, the judgment is made that the setting for the second tray 17b is set to the plain paper, and the comparison unit makes a comparison between the image forming condition B and the image forming condition A. Under the image forming condition A, A4-1 is set as A4 size while the back-side printing is designated.

In that case, where the comparison is made between the image forming condition B and the image forming condition A, the double-side printing is designated as the image forming condition B, whereas the back-side printing is designated as the image forming condition A, so the conditions are different from each other.

Therefore, the message for asking the double-side printing using the plain papers is transmitted to the host apparatus 20.

Explained next is a situation that the manager sets A4-2 as A4 size, designates the double-side printing using the plain papers, and sets the N-up printing as well as the toner saving printing as the image forming condition A.

In this situation, the operator sets, as the image forming condition B, A4-2 as A4 size, and the one-side printing, the single page printing, and the toner saving printing using the plain papers. Where the host apparatus 20 transmits the image forming condition B, the judgment is made that the setting for the first tray 17a is set to the plain papers, and the comparison unit makes a comparison between the image forming condition B and the image forming condition A.

When the comparison is made between the image forming condition B and the image forming condition A, the one-side printing is designated as the image forming condition B whereas the double-side printing is designated as the image forming condition A, so that the conditions are different from each other.

The printer 11, herein, transmits the message such as, e.g., "Current setting is for the one-side printing. Would you like to change it to the double-side printing?" When the printer 11 receives the image forming condition B from the host apparatus 20, and when the change to the double-side printing is made, the page decision unit in the printer controller 12 makes a judgment as to the number of pages to which the printing is to be made. This is because printing is made as it is without operating the double-side printing in a case where the number of pages to be printed is judged as a single page. It is to be noted that for example, where the number of pages is judged as four, the N-up printing is designated as the image forming condition A, whereas the N-up printing is not designated as the image forming condition B, so the printer 11 transmits the message to the host apparatus 20, such as, e.g., "Current setting is not for the N-up printing. Would you like to change it to the N-up printing?" and the change is asked in the same manner as the double-side printing.

Subsequently, the printer 11 ask similarly the change of the condition to the toner saving printing, and when the change of the condition is implemented, the printing unit in the printer controller 12 starts the printing operation under the conditions of the double-side printing, the N-up printing, and the toner saving printing.

As described above, with this embodiment, when the operator of the printer 11 connected with the network does printing, even where the image forming condition A recommend by the manager of the printer 11 does not coincide with the image forming condition B set in the host apparatus 20, the message for asking the change from the image forming condition B to the image forming condition A is transmitted to the host apparatus 20 to be displayed on the displaying device 23 in the host apparatus 20, so that the operator can automatically know the image forming condition A recommended with the printer 11.

Furthermore, since the conditions required to change are displayed out of the image forming condition B, it is unnecessary to search which conditions are different from the image forming condition A, so the operation for changing the conditions can be simplified.

Situations increase in which the printing can be operated under the image forming condition A as intended by the manager of the printer 11, so that when operating the printing under the saving modes such as, e.g., the back-side printing, the N-up printing, the toner saving printing, etc., the operator does not have to input, prior to the printing, the prescribed setting upon opening the menu of the printer driver 25. The image formation under each of the saving modes, therefore, can be effectively utilized as intended by the managers of the printer 11, and the cost, etc.

In the meantime, according to the above described first embodiment, the image forming condition A is rendered corresponding equally to all of the operators using the printer 11, and where the image forming condition B and the image forming condition A do not coincide with each other, the change of the condition is to be asked, but when another operator uses the printer 11, he may feel the image forming condition A as complicated. That is, supposedly, an operator having more occasions to print less important documents, memos, or the like, may have no problem even when any of the back-side printing, the N-up printing, and the like is designated, whereas the operator having more occasions to print graphic designs, formal documents, or the like, may suffer from problems when any of the back-side printing, the N-up printing, and the like is designated. The operationality of the operator may be therefore deteriorated.

To solve this problem, described herein is the second embodiment in which operators can operate in an improved manner. It is to be noted that members structured the same as in the first embodiment are assigned with the same numerals to omit the duplicated explanation, and the advantages of this invention are applicable to the second embodiment because of the same structure as the first embodiment.

Figure 8:
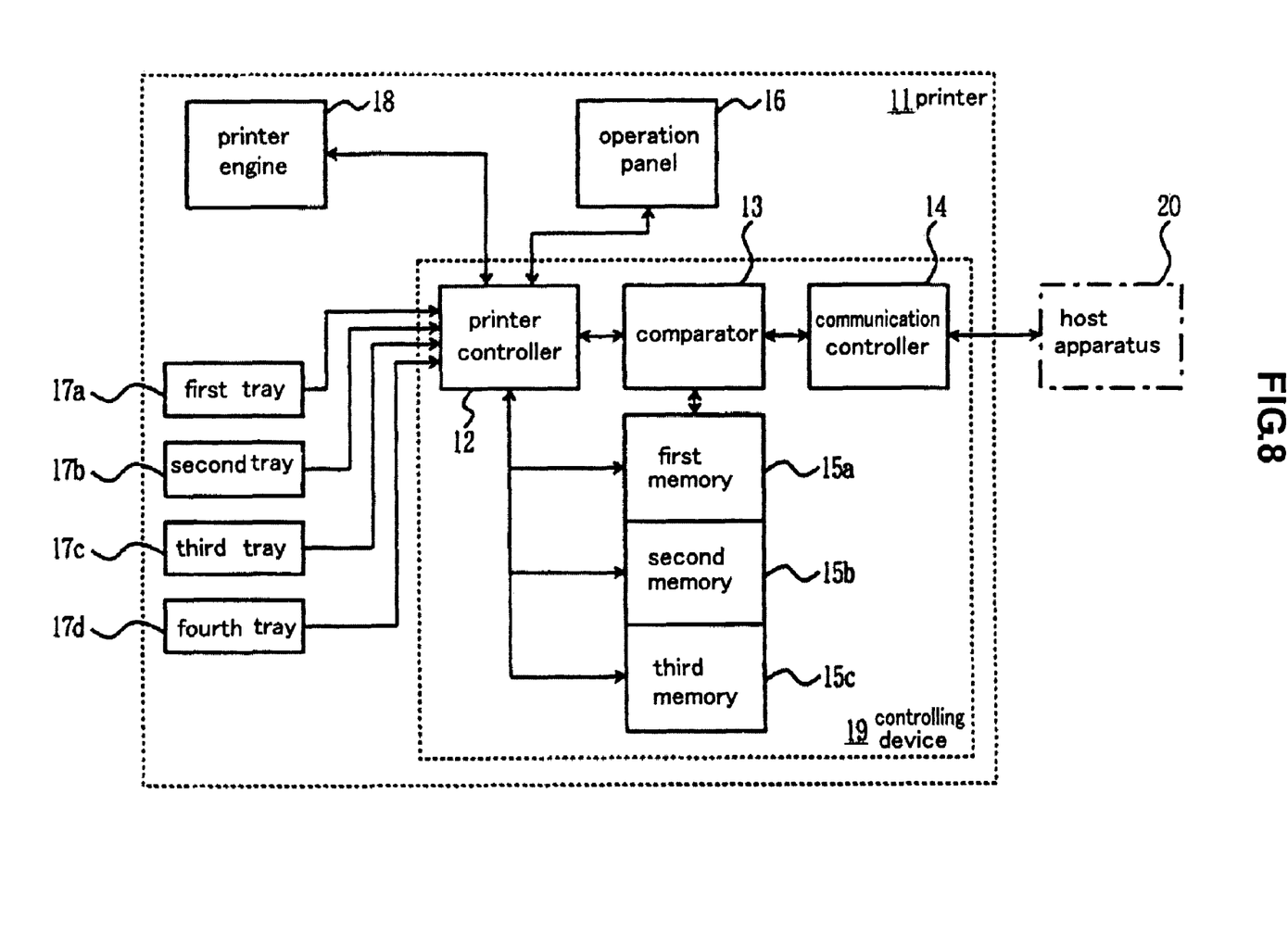
FIG. 8 is a block diagram showing a printer according to the second embodiment of this invention.
Figure 9:
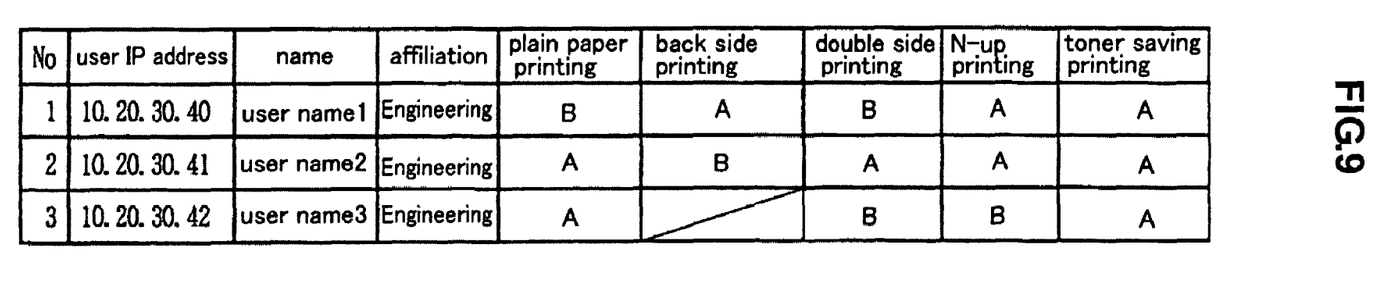
FIG. 9 is a table showing an example of user information according to the second embodiment of this invention.

FIG. 8 is a block diagram showing a printer according to the second embodiment of this invention, and FIG. 9 is a view showing an example of user information according to the second embodiment of this invention.

In that case, the third memory 15c composed of a rewritable nonvolatile memory such as, e.g., a flash memory, is arranged within the printer 1. It is to be noted that the first memory 15a, the second memory 15b, and the third memory 15c may be respectively composed of separated memory IC (Integrated Circuit), or may be composed upon dividing an inside of one memory IC, and upon thereafter allocating the divided inside to each memory.

In the third memory 15c, user information recommended at a time of using the printer is stored. As shown in FIG. 9, the user information is includes, with respect to each operator, an image forming condition C defined as the third image forming condition including, e.g., the setting values as to whether to designate each condition recommended with the printer 11 other than personal information such as, e.g., user IP (Internet Protocol) address, name, and affiliation, etc. Each of the setting values composing the image forming condition can be set separately, in the same manner as the setting of the condition as shown in FIG. 3, including the plain paper printing, the back-side printing, the double-side printing, the N-up printing, the toner saving printing, and so on.

Operation of the printer 11 thus structured is described next.

According to this embodiment, prior to start of the printing, user registration needs to be done on the printer 11. It is to be noted that the user registration may be done by the manager, in which either use of the image forming condition A recommended with the printer 11 or use of the image forming condition B stored as the user information can be registered for each operator, and at a time of the registration, a password limit can be added if needed. Therefore, the manager operates the operation panel 16 serving as the operation unit of the printer 11 to enter setting or skip setting for each operator with respect to the user IP address as well as each condition of the image forming condition C. The printer controller 12 serving as the controller stores the input image forming condition C in the third memory 15c.

It is to be noted that though the operation of the host apparatus 20 is approximately the same as that of the first embodiment, when the host apparatus 20 receives the image forming data and the image forming instruction from the application 21 (in FIG. 2), the data transmitter 34 serving as the data transmitting unit retrieves the user IP addresses corresponding to the operator from the operating system 22, while retrieving the image forming setting information as the image forming condition B from the image forming setting information memory 32, thereby transmitting the image forming condition B as well as the information that the setting flag is equal to zero to the printer 11.

Printing operation of the printer 11 is described next.

Figure 10:
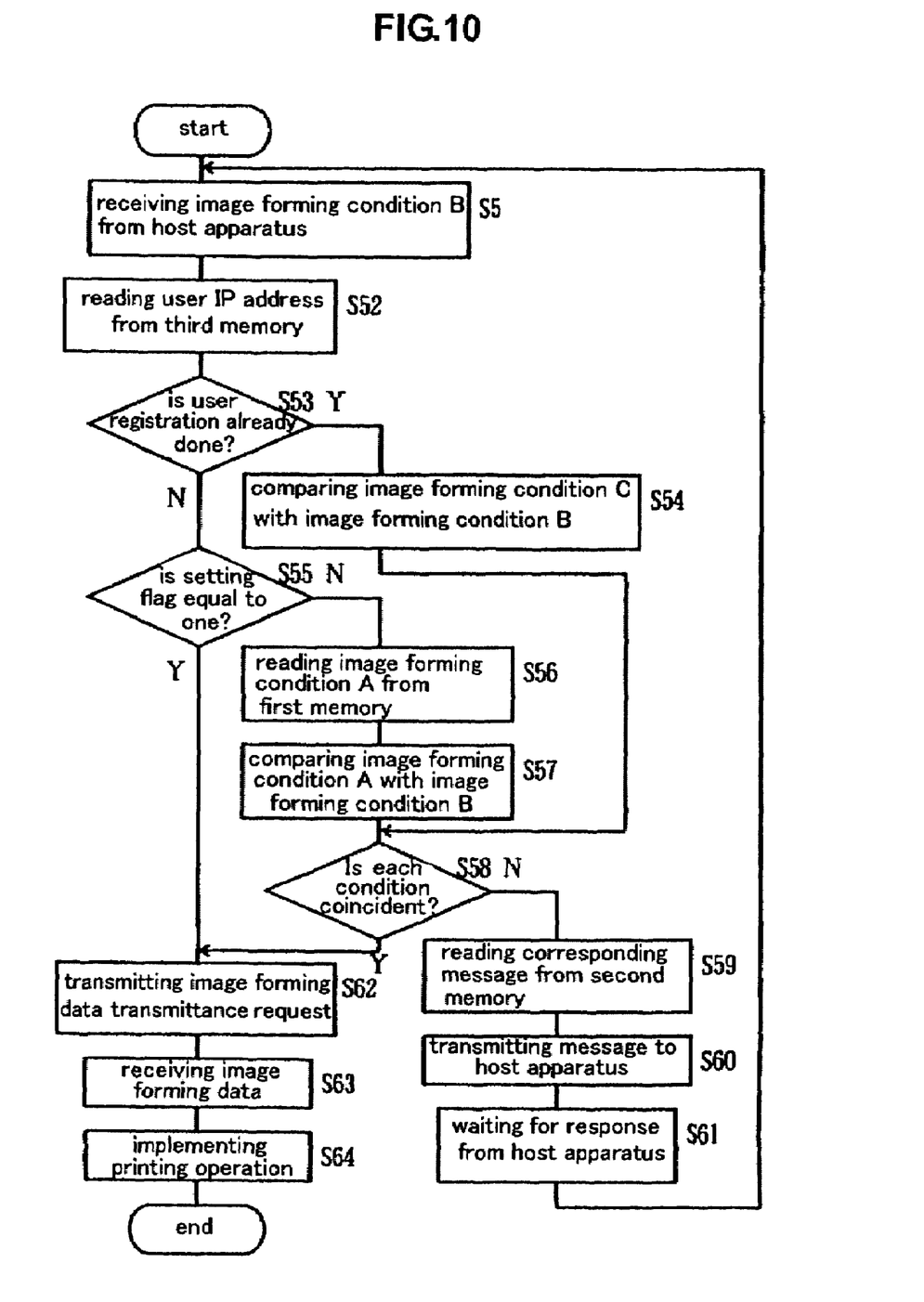
FIG. 10 is a flowchart showing operation of the printer according to the second embodiment of this invention.

FIG. 10 is a flowchart showing operation of the printer according to the second embodiment of this invention.

In that case, when the printer 11 (shown in FIG. 8) receives the user IP address, the image forming condition B, and the information that the setting flag is equal to zero through the communication controller 14 from the host apparatus 20, the image forming condition retrieving unit in the printer controller 12 retrieves the user IP address from the third memory 15c, and the judgment is subsequently made according to each of IP address as to whether the user registration of the operator is already done. Where the user registration of the operator is not done yet, the image forming condition retrieving unit makes a judgment as to whether the setting flag is equal to zero or one. The setting flag is set to zero according to this embodiment, so the image forming condition retrieving unit retrieves the image forming condition A from the first memory 15a.

Subsequently, the comparator 13 functioning as the comparison unit makes a comparison between the image forming condition A on the side of the printer 11 and the image forming condition B transmitted from the host apparatus 20, thereby making a judgment as to whether each condition is coincident. Where each condition is coincident, the transmittance request unit transmits the image forming data transmittance request to the host apparatus 20. The printer 11 thereafter implements, as described above, the printing operation under the image forming condition B according to the image forming data. Furthermore, where any condition is not coincident, the printer 11 retrieves out of the second memory 15b the message corresponding to the image forming condition B for each not coincident condition, and thereafter transmits the above retrieved message to the host apparatus 20 through the communication controller 14 serving as the communication unit, thereby waiting for a response from the host apparatus 20.

When receiving the message for asking the change from the printer 11, the host apparatus 20 changes the image forming condition B as corresponding to the received message, and sets the setting flag to zero, thereby transmitting the changed image forming condition B, the user IP address, and the setting flag to the printer 11.

Where the user registration of the operator is already done, on the other hand, the image forming condition retrieving unit retrieves the corresponding image forming condition C, while the comparator 13 makes a comparison between the image forming condition C on the side of the printer 11 and the image forming condition B transmitted from the host apparatus 20, thereby making a judgment as to whether each condition is coincident. Where each condition is coincident, the transmittance request unit transmits the image forming data transmittance request to the host apparatus 20. The printing operation is thereafter implemented, as described above, under the image forming condition B according to the image forming data. Where any condition is not coincident, the printer 11 retrieves out of the second memory 15b the message corresponding to the image forming condition B for each non-coincident condition, and thereafter transmits the read message to the host apparatus 20 through the communication controller 14, thereby waiting for a response from the host apparatus 20.

When receiving the message for demanding the request from the printer 11, the host apparatus 20 changes the image forming condition B as corresponding to the received message and sets the setting flag to one, thereby transmitting the changed image forming condition B, the IP address, and the setting flag to the printer 11.

Where the setting flag is set to one, the transmittance request unit in the printer controller 12 transmits the image forming data transmittance request to the host apparatus 20.

With the host apparatus 20, the data receiver 36 serving as the data receiving unit accepts the request for the image forming data, and the data transmitter 34 transmits the image forming data to the printer 11. When the printer 11 subsequently receives the image forming data, the printing unit in the printer controller 12 implements the printing operation under the image forming condition B according to the image forming data.

In this embodiment, as described above, the third memory 15c is arranged in the printer 11, and the user information is stored in the third memory 15c, so that the image forming conditions can be set respectively according to need for each operator. The operationality of the operator can therefore be further improved.

The flowchart is explained next. The printer 11 receives the image forming condition B from the host apparatus 20 at the step S51. The printer 11 reads the user IP address from the third memory 15c at the step S52. The judgment is made at the step S53 as to whether the user registration is already done. Where the user registration is already done, the operation goes to the step S54, whereas where the user registration is not done yet, the operation goes to the step S55. The comparison is made at the step S54 between the image forming condition C and the image forming condition B. The judgment is made at the step S55 as to whether the setting flag is equal to one. Where the setting flag is equal to one, the operation goes to the step S62, whereas the setting flag is not equal to one, the operation goes to the step S56. The image forming condition A is read out of the first memory 15a at the step S56. The comparison is made at the step S57 between the image forming condition A and the image forming condition B. The judgment is made at the step S58 as to whether each condition is coincident. Where each condition is coincident, the operation goes to the step S62, whereas where any condition is not coincident, the operation goes to the step S59. The printer 11 reads the corresponding message from the second memory 15*b* at the step S59. The printer 11 transmits the message to the host apparatus 20 at the step S60. At the step S61, the printer 11 waits for a response from the host apparatus 20, and the operation returns to the step S51. The printer 11 transmits the image forming data transmittance request at the step S62. The printer 11 receives the image forming data at the step S63. The printing operation is implemented, and this processing is completed at the step S64.

It is to be noted that this invention is not limited to these above described embodiments but can be variously modified based on the purpose of this invention, and these modifications are not excluded from the scope of this invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus comprising:
   a medium container for containing a medium;
   a setting unit for setting a type of the medium contained in the medium container;
   a memory for memorizing a first image forming condition relating to a printing mode and previously set;
   a comparison unit for comparing a second image forming condition transmitted from a host apparatus with said first image forming condition;
   a page decision processing unit judging the number of pages to be printed; and
   a communication unit for transmitting to said host apparatus, in a case where said first and second image forming conditions are different from each other, a prescribed message determined based on said first and second image forming conditions, said type of the medium, and the number of pages judged by said page decision processing unit,
   wherein said communication unit determines said prescribed message based on said first and second image forming conditions, said type of medium, and the number of pages judged by said page decision processing unit.

2. The image forming apparatus according to claim 1, wherein said image forming apparatus has a plurality of medium containers respectively corresponding to each of a plurality of medium types.

3. The image forming apparatus according to claim 1, wherein said message is a message such as asking change of said second image forming condition.

4. The image forming apparatus according to claim 2, and further comprising said medium container for containing one side printed papers, wherein said first and second image forming conditions are designated as back-side printing.

5. The image forming apparatus according to claim 1, and further comprising a printing unit for implementing printing operation after said message is transmitted to said host apparatus.

6. An image forming apparatus comprising:
   a medium container for containing a medium;
   a setting unit for setting a type of the medium contained in the medium container;
   a memory for memorizing a first image forming condition previously set;
   a comparison unit for comparing a second image forming condition transmitted from a host apparatus with said first image forming condition; and
   a communication unit for transmitting to said host apparatus, in a case where said first and second image forming conditions are different from each other, a prescribed message determined based on said first and second image forming conditions and said type of the medium;
   and further comprising memory for memorizing a third image forming condition set for each of a plurality of operators upon operation with an operation unit,
   wherein said comparison unit compares said second image forming condition transmitted from said host apparatus with said third image forming condition, and wherein said communication unit transmits, in a case where said second and third image forming conditions are different from each other, a prescribed message corresponding to said second image forming condition to said host apparatus.

7. The image forming apparatus according to claim 1, wherein at least one of plain paper printing, back-side printing, double-side printing, N-up printing, and toner saving printing is set as said first image forming condition.

8. The image forming apparatus according to claim 7, wherein at least two or more conditions are set as said second image forming condition, wherein said comparison unit makes a comparison as to whether said first and second image forming conditions are coincident exactly with each other, and wherein said communication unit reads, in a case where any non-coincident message exists, said message for each non-coincident condition to transmit said message to said host apparatus.

9. The image forming apparatus according to claim 8, wherein said comparison unit makes a comparison between said second image forming condition changed with said host apparatus and said first image forming condition, comprising an image data transmittance request section for operating an image data transmittance request to said host apparatus in a case where said first image forming condition and said changed second image forming condition are coincident with each other.

10. The image forming apparatus according to claim 8, and further comprising an image data transmittance request section for operating an image data transmittance request to said host apparatus in a case where said first and second image forming conditions are coincident with each other.

11. The image forming apparatus according to claim 6, wherein said third image forming condition includes user information, and wherein said comparison unit reads said third image forming condition to make a comparison between said third image forming condition and said second image forming condition in a case where the third image forming condition corresponding to said user information transmitted from said host apparatus exists.

12. The image forming apparatus according to claim 11, wherein said comparison unit reads said first image forming condition to make a comparison between said first image forming condition and said second image forming condition in a case where no third image forming condition corresponding to said user information transmitted from said host apparatus exists.

13. The image forming apparatus according to claim 1, wherein said first image forming conditions is set by an administrator.

14. The image forming apparatus according to claim 13, wherein said administrator is distinct from a user of the host apparatus, and the user of the host apparatus determines the second image forming condition.

* * * * *